United States Patent
Barnhill

(10) Patent No.: US 12,446,685 B2
(45) Date of Patent: Oct. 21, 2025

(54) PORTABLE CUSTOMIZABLE WORKSTATION

(71) Applicant: Claude Barnhill, Indianapolis, IN (US)

(72) Inventor: Claude Barnhill, Indianapolis, IN (US)

( * ) Notice: Subject to any disclaimer, the term of this patent is extended or adjusted under 35 U.S.C. 154(b) by 0 days.

(21) Appl. No.: 17/945,878

(22) Filed: Sep. 15, 2022

(65) Prior Publication Data

US 2024/0172866 A1 May 30, 2024

Related U.S. Application Data

(60) Provisional application No. 63/244,616, filed on Sep. 15, 2021.

(51) Int. Cl.
*A47B 3/14* (2006.01)
*A47B 13/00* (2006.01)
*A47B 21/04* (2006.01)
*A47B 83/00* (2006.01)

(52) U.S. Cl.
CPC .............. *A47B 3/14* (2013.01); *A47B 13/003* (2013.01); *A47B 21/04* (2013.01); *A47B 83/001* (2013.01); *A47B 2200/005* (2013.01); *A47B 2200/007* (2013.01)

(58) Field of Classification Search
CPC ... A47B 2003/145; A47B 3/14; A47B 83/001; A47B 2200/007
USPC ............ 297/139; 108/38, 44, 26, 49, 50.01, 108/50.02
See application file for complete search history.

(56) References Cited

U.S. PATENT DOCUMENTS

| | | | | |
|---|---|---|---|---|
| 88,256 | A * | 3/1869 | Bacon | A47B 3/14 108/50.11 |
| 779,202 | A * | 1/1905 | Burgess | A47B 3/14 297/174 R |
| 4,067,606 | A * | 1/1978 | Desmoulins nee Fouchereau | B62B 3/1472 297/239 |
| 4,915,450 | A * | 4/1990 | Cooper | F16M 11/10 297/188.21 |
| 5,378,037 | A * | 1/1995 | Beasley | B25H 1/04 297/182 |
| 6,439,133 | B1 * | 8/2002 | Jaramillo | A47B 21/0314 108/44 |
| 6,578,708 | B2 | 6/2003 | Barnett | |
| 6,953,222 | B2 * | 10/2005 | Larrick | A47C 9/08 297/118 |
| 7,819,247 | B2 | 10/2010 | Gonzalez | |
| 7,859,836 | B2 | 12/2010 | Bae | |
| 8,272,600 | B2 * | 9/2012 | Copeland | G06F 3/021 108/50.01 |
| 8,459,734 | B2 * | 6/2013 | Herschler | A47B 3/14 297/440.1 |
| 9,201,476 | B2 | 12/2015 | Zhang | |
| 2004/0173125 | A1 * | 9/2004 | Chang | A47B 21/03 108/50.01 |
| 2004/0226791 | A1 | 11/2004 | Levy | |
| 2008/0041683 | A1 | 2/2008 | Dorquez | |

(Continued)

Primary Examiner — Jose V Chen
(74) Attorney, Agent, or Firm — Edison Law Group, PLLC

(57) ABSTRACT

A portable customizable workstation is provided that comprises a container, a deployable collapsible desk with one or more work surfaces, one or more computer device holders, and a deployable collapsible chair, and, optionally, an interface platform that shares access and data between two or more computer devices.

1 Claim, 5 Drawing Sheets

(56) References Cited

U.S. PATENT DOCUMENTS

| | | | |
|---|---|---|---|
| 2010/0319588 A1* | 12/2010 | Hanna | B60N 3/001 |
| | | | 108/20 |
| 2017/0273451 A1* | 9/2017 | Jeanphilippe | F21V 33/0012 |
| 2019/0277594 A1* | 9/2019 | Kinney | F41A 23/16 |
| 2019/0380484 A1* | 12/2019 | Ortega | A47B 3/14 |
| 2020/0345131 A1 | 11/2020 | Robinson | |
| 2021/0353048 A1* | 11/2021 | Rivera, Jr. | A47B 3/14 |

* cited by examiner

PORTABLE CUSTOMIZABLE WORKSTATION

RELATED APPLICATION

This application claims priority to the provisional application 63/244,616 filed on Sep. 15, 2021.

FIELD OF THE INVENTION

The invention relates to a portable customizable workstation.

BACKGROUND OF THE INVENTION

Designated work areas have been used in the past. These include desks and chairs that may accommodate computers and keyboards. They are usually generic and not customizable to specifically fit, or optimize or otherwise enhance, the physical needs, desires, or experiences of different people doing different activities that may use these work areas. These work areas used in the past have often been bulky, requiring several people to move them, and they are not conducive to being used while traveling or even when moving locally, such as when moving from room to room.

An improved portable and customizable work area is therefore needed. Such an improved work area that is needed could be customizable to accommodate different people with different physical needs. It would also be beneficial to have a work area that was portable (i.e., relatively moveable). Such an improved workstation also could be customizable to accommodate people when they are doing different activities and/or using different devices and enhance and simplify such.

SUMMARY OF THE INVENTION

This invention provides improved work areas, including embodiments that relate to a portable customizable workstation. These embodiments include a customizable workstation that is portable, mobile, moveable, or semi-permanent (e.g., bolted to the floor), which is referred to as "portable" herein. These embodiments also include a customizable workstation for one or more people to use. As used herein, "workstation" includes what a person of ordinary skill in the art could also call a "workspace," a "study space," a "creative space," or a "play space," or other such descriptive words, which relate to an area where a person may perform focused work, tasks, study, art or play, or similar activities.

Embodiments of this invention include a portable container (e.g., a case) that includes a collapsible desk and, in some embodiments, a collapsible chair. The height of the desk and the optional chair can be adjusted in certain embodiments. The collapsible desk is unfolded, telescoped down from, or otherwise removed from a nesting place in the container, or formed from the container. As used herein, "unfolded" or "removed from storage" means detached from, extracted, moved on a hinge, or other ways of having a component made accessible when used and then placed back into storage (e.g., "folded up") or its housing when it is not being used.

The collapsible desk when deployed is capable of providing one or more work surfaces that may be unfolded or otherwise opened or deployed from a position of storage on or within the desk (e.g., accessible when the top of the desk is opened away from the user, accessible when folded away to the side of the desk, accessible when a work surface is pulled out or slidable laterally from the desk (e.g., like a drawer)). The desk also provides one or more computer device holders (e.g., a tension engagement unit that squeezes the device, a platform, or other means and/or hardware known to a person of skill in the art) that each can be used to hold a computer device (e.g., such as one or more laptop computers, keyboards, mouse pads, monitors, tablets, mobile telephones, or other computerized devices). In certain embodiments the one or more computer device holders are fixedly attached to the one or more work surfaces.

Certain embodiments of this invention are capable of incorporating one or more computer devices into the workstation for a user to access. The computer devices are incorporated by using one or more computer device holders. Certain embodiments of this invention also provide for the sharing of access and data between two or more computer devices through an interface platform, for which an example is referred to herein as an in-sync system.

Preferred embodiments of this invention include a case or other type of container that can be carried by one person. A collapsible desk, desk stand and chair can be folded or otherwise deployed from the container to convert or transform the container into a workstation where a person can sit or stand and perform tasks. The desk, desk stand and chair can be adjusted to accommodate a particular person's comfort and access. The desk can contain (or is capable of containing) one or more computer devices including a laptop computer, a tablet, a mobile telephone, and other computerized devices. These devices can be securely held in place on the desk and adjusted to accommodate a particular person's comfort and access. In certain embodiments, two or more of the computer devices can be synchronized or otherwise integrated with one another by an in-sync interface platform system that allows for the sharing of access and data between the computer devices. The desk can include one or more folded workspaces or work surfaces that can be accessed by unfolding or deploying them from the desk.

It is an object of certain embodiments of this invention that the workstation provide a discrete and/or efficient space for activities.

It is an object of certain embodiments of this invention that the workstation be customizable to fit particular people and/or particular activities.

It is an object of certain embodiments of this invention that the workstation be portable (i.e., portable, mobile, moveable, or semi-permanent (e.g., bolted to the floor)).

It is an object of certain embodiments of this invention that the workstation be customizable and useable to make a person more efficient and/or comfortable in their work and/or other activities by being, for example, more ergonomic, more accessible, with the possible and optional use of centralized and integrated systems and platforms, personal assistants, artificial intelligence, security provisions, and/or access to business support applications.

Applications for the embodiments of this invention include using portable customizable workstations as places to work at home, in offices and other businesses, in hotels while traveling, or in public places (e.g., a courtroom by a court reporter), as examples. These applications can comprise applying or otherwise combining the features of embodiments of this invention for uses by particular persons or for particular activities. The person of skill in the art understands after reading this specification how these applications and combining of the embodiments of this invention can be done.

Advantages of the embodiments of this invention are described and apparent throughout this specification. Certain embodiments of the customizable workstation can be changed, altered or adjusted to accommodate different people, with different physical needs (e.g., height, leg length, arm reach, eye level, disabilities). Such customization of some of these embodiments may specifically or better fit, or optimize or otherwise enhance, the physical needs, desires, or experiences of different people doing different activities that may use these workstations. Certain embodiments can also provide for the integration and synchronization of information from different computer devices.

DETAILED DESCRIPTION OF THE INVENTION

Figure 1:
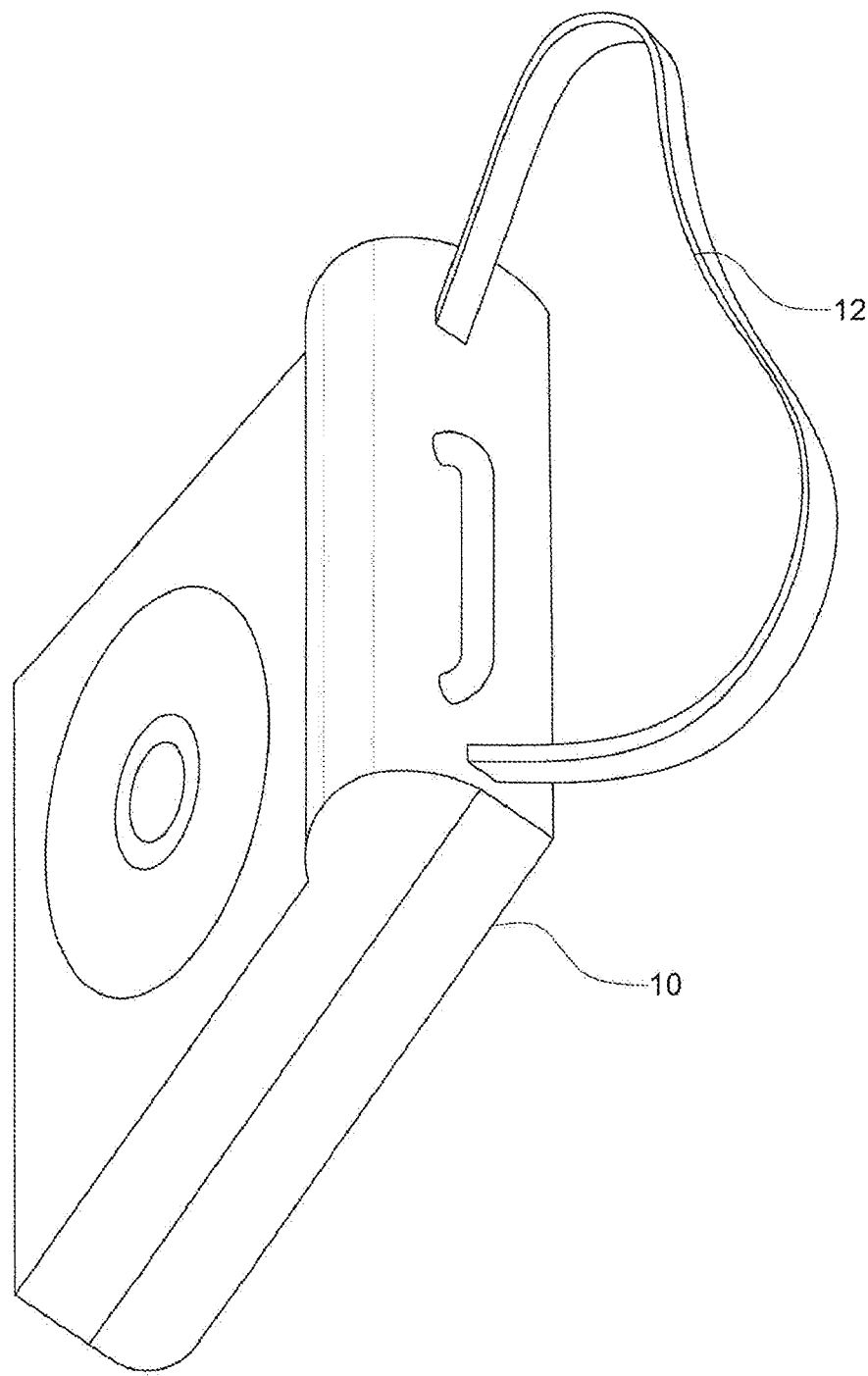
FIG. 1 is a perspective view of an embodiment of a case 21 of the invention.

The invention provides a portable customizable workstation. In certain embodiments the customizable workstation can be customizable to the particular person or persons using it. In certain embodiments the customizable workstation can be customizable to the particular activity or activities for which it will be used.

Embodiments of this invention can be applied to different users, including business executives, teachers, students, salespeople, healthcare workers, other workers, court reporters, computer technologists, and others, to enable them to create, or have someone create for them, an improved workstation that may fit, optimize or improve one or more aspects of their activities. Some advantages that can result from this invention depend on the application, but can include improved organization, improved efficiency and/or time management, improved convenience, improved set-up and breakdown, and improved integration with devices and other aspects of their lives.

A preferred embodiment of this invention is a portable customizable workstation comprising a portable container (e.g., a case), the portable container comprising a top portion and a bottom portion. The portable container further comprises a deployable collapsible desk.

The deployable collapsible desk comprises a work surface that is deployed out of the top portion of the container. The work surface can be attached to the deployable collapsible desk by a variety of possible means and/or hardware, including hinges, screws, bolts and other devices known to a person of skill in the art. The deployable collapsible desk can also comprise one or more additional work surfaces that each are housed within and/or attached to the deployable collapsible desk by a variety of possible means and/or hardware known to a person of skill in the art and can be deployed out of its housing to form a work surface.

In one preferred embodiment, the deployable collapsible desk comprises a top piece that can be pivoted back to provide a backstop to a laptop computer screen, the top piece being hingedly attached to the top of the deployable collapsible desk. In another preferred embodiment, the deployable collapsible desk comprises a piece that can be pivoted to the side to provide support for a tablet computer, a mobile telephone or both, said side piece being slidable laterally or hingedly attached (or attached with other means and/or hardware known to a person of skill in the art) to the deployable collapsible desk. In still another preferred embodiment, the deployable collapsible desk comprises a laptop computer holder that is fixedly attached to, and holds the laptop computer onto, the top of the deployable collapsible desk.

The deployable collapsible desk can also comprise one or more computer device holders (e.g., laptop holders, mobile telephone holders, tablet holders) that each are housed within and fixedly attached to the deployable collapsible desk and can be used to attach a computer device to the workstation. The computer device holders can be fixedly attached to the deployable collapsible desk by a variety of possible means and/or hardware, including hinges, screws, bolts and other devices known to a person of skill in the art. The computer device holders can also be slidable laterally from the desk and be housed in a opening in the desk.

The deployable collapsible desk can also comprise a deployable collapsible desk stand that is deployed out of the bottom portion of the container, said desk stand being fixedly attached to the desk and when deployed rests on the floor. The deployable collapsible desk can also comprise a desk adjustment device that can adjust the height of the deployable collapsible desk by a set screw, tension device, or other means and/or hardware known to a person of skill in the art. The desk adjustment device is attached to one or more places (e.g., the top, the bottom, or the middle) of the deployable collapsible desk or desk stand.

Alternatively, desk legs can be used for the desk stand and they can be deployed by attaching (e.g., by cotter pins, screws, bolts, spring latches, or threads, or other means and/or hardware known to a person of skill in the art) them to the bottom of the desk or, if they are already attached, extending, telescoping, or deploying them out to form the full length of the legs. If the legs are not fixedly attached to the bottom of the desk before the desk is deployed, then they can be stored in or on the container or case and then removed and deployed as needed.

The portable container can also comprise a deployable collapsible chair, the deployable collapsible chair comprising a seat, a chair stand, which itself may be deployable and collapsible, and a chair adjustment device that can adjust the height of the seat. The seat is fixedly attached to the chair stand by a variety of means and/or hardware known to a person of skill in the art (e.g., bolts, screws, welds) and said chair stand is fixedly attached to the deployable collapsible desk stand by a variety of means and/or hardware known to a person of skill in the art (e.g., bolts, screws, welds). The deployable collapsible chair, or its chair stand, can be attached to the desk stand by a variety of means and/or hardware known to a person of skill in the art (e.g., bolts, screws, welds).

In other preferred embodiments the portable customizable workstation also comprises an interface platform that integrates the functions of two or more computer devices so that they share access and data between them.

The subject matter of this disclosure is now described with reference to the following Examples. These Examples are provided for the purpose of illustration only, and the subject matter is not limited to these Examples, but rather encompasses all variations which are evident as a result of the teaching provided herein.

Example 1

An embodiment of this invention can include a case (e.g., container, attaché case, suitcase-like container). FIG. 1 shows an example of a case 10 that is an embodiment of this invention. Such embodiments can be lightweight and thus be carry-able by one person. Other embodiments may be heavier and require more people to carry them or be moved with wheels, dollies or other similar devices.

Such embodiments can be of a wireframe or similar construction, although other constructions are possible and included in this invention. Some embodiments of the case can include one or more handles, straps 12, and/or one or more other components that can be grasped for moving the case. Some embodiments of the case can include wheels that can be used for moving the case. Some embodiments of the case can be comprised of an outside covering that can include a cloth, leather or plastic outer covering or some other material or substance. Such an outside covering in some embodiments protects the contents from damage.

The case used in certain embodiments of this invention can enclose a space that contains or is capable of containing one or more computer devices, such as one or more laptops 31, keyboards, tablets, mobile telephones, or other computerized devices, as well as one or more workspace or work surface areas housed in the case. These work surface areas are folded, slidable laterally, or housed in or stored on the case until the user is ready to use them, in which case they can be unfolded, slid out, opened up or otherwise deployed from the case and used. Some of these embodiments of the case used in certain embodiments of this invention can also include one or more attachment devices, such as hooks, latches, straps, levers, and/or other such means and/or hardware, for holding the one or more of the computer devices. Some of these attachment devices are adjustable to accommodate the one or more computerized devices in their storage, secure holding, placement and use. An example of these embodiments includes one or more adjustment levers that each can be adjusted to accommodate different sized laptops, tablets, mobile telephones, or other computerized devices. Some of these embodiments can be adjusted to change, optimize or otherwise enhance the placement of the one or more computer devices, such as to tilt the device to make it easier to access, use or see.

Embodiments of the case of this invention can include a collapsible (e.g., folds up or telescopes back when not in use into the case) desk embodiment. Some of these case and/or collapsible desk embodiments can include a collapsible (e.g., folds up or telescopes back when not in use into the desk, desk stand and/or case) chair embodiment (e.g., sitting part such as a chair, stool or bench). In other embodiments, the collapsible desk is useable as a standing desk with or without a collapsible chair embodiment. Preferred embodiments of these collapsible desk embodiments and/or collapsible chair embodiments are customizable (e.g., adjustable) to fit the person using, and/or computer devices used with, the customizable workstation. In some of these embodiments the customization (e.g., adjustment or fitting) is done with one or more devices, such as one or more adjustment devices, such as adjustment levers, for the desk and/or the chair. Such customization of some of these embodiments may also improve the fit for different activities or optimize or otherwise enhance the experience of people doing different or particular activities. Such customization of some of these embodiments may specifically or better fit, or optimize or otherwise enhance, the physical needs, desires, or experiences of different people doing different activities that may use these workstations.

Figure 2:
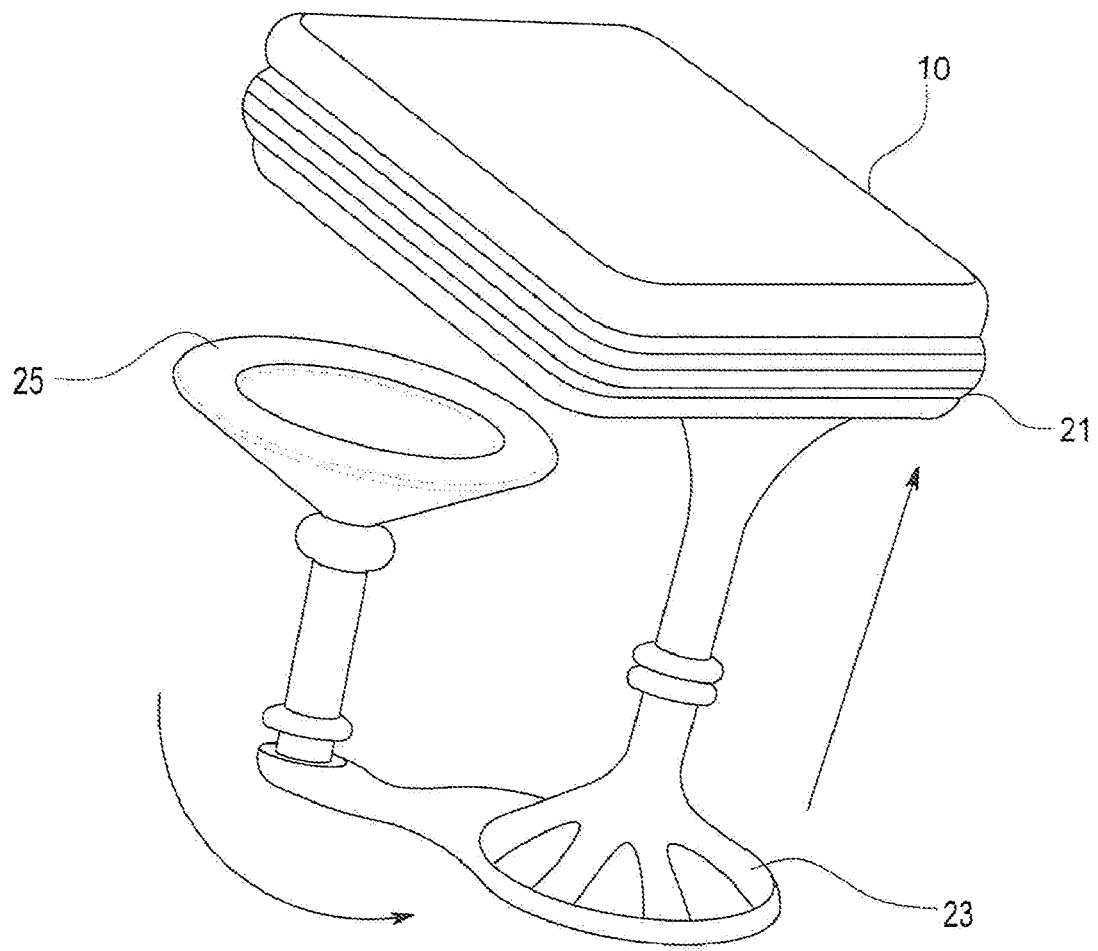
FIG. 2 is a perspective view of an embodiment of a partially deployed portable customizable workstation of the invention with a desk 21, desk stand 23 and chair 25 deployed from a case 10 as shown by arrows.
Figure 3:
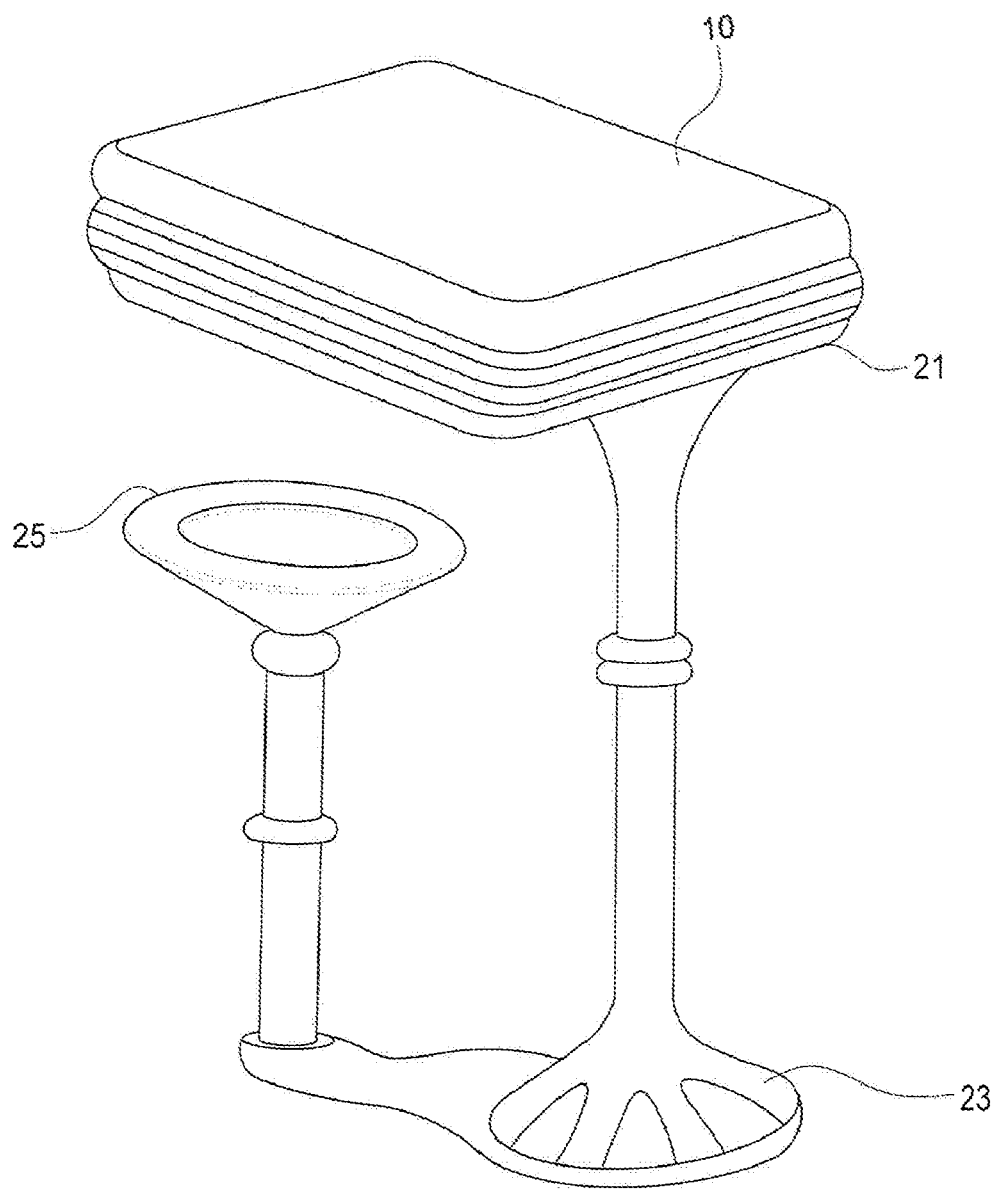
FIG. 3 is a perspective view of an embodiment of a partially deployed portable customizable workstation of the invention with a desk 21, desk stand 23 and chair 25 deployed from a case 10.

FIG. 2 shows an embodiment of this invention in which, from a case 10, a collapsible desk 21 with a desk stand 23 and a collapsible chair 25 are deployed, as indicated by the arrows. FIG. 3 shows the embodiment of the collapsible desk 21, desk stand 23 and collapsible chair 25 deployed.

Figure 4:
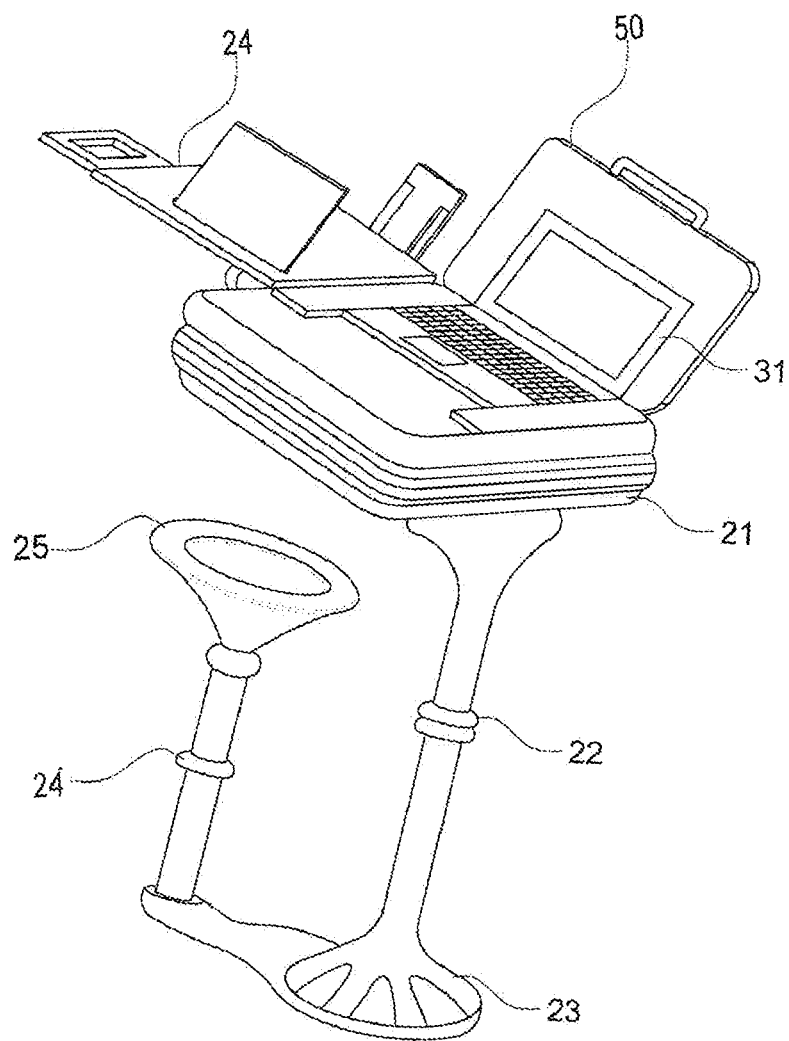
FIG. 4 is a perspective view of an embodiment of a deployed portable customizable workstation 50 of the invention with a desk 21, laptop computer 31, desk stand 23 and chair 25 and deployed work surface 24.

FIG. 4 shows an embodiment of this invention of a portable customizable workstation 50 with a desk 21, desk adjustment device 22, desk stand 23, chair 25 and chair adjustment device 24. Held on the desk 23 is a laptop computer device 31 and the desk 23 includes a fold-out portion 24 with additional work area.

Figure 5:
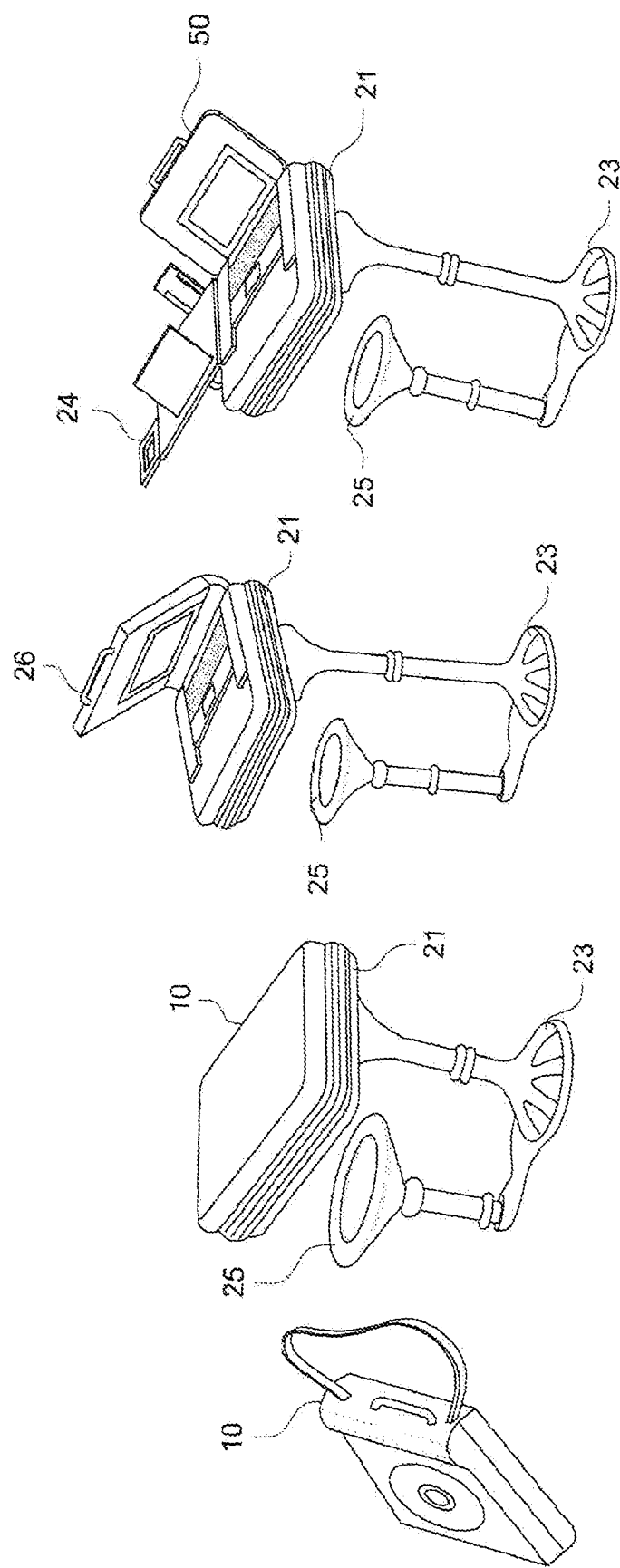
FIG. 5 a perspective view of an embodiment of this invention that shows the conversion or transformation of a case 10 to a deployed portable customizable workstation 50.

FIG. 5 shows an embodiment of this invention as a case 10 is stepwise converted (e.g., transformed) to a portable customizable workstation 50. For step 1, a collapsible desk 21, desk stand 23 and collapsible chair 25 are deployed from the case 10. For step 2, the lid 26 of the desk 21 is being opened. Finally, with step 3 the lid 26 of the desk 21 is open, and a laptop computer device 31 and a fold-out portion 24 with additional workspace is available for use by a user of the portable customizable workstation 50.

In certain embodiments of this invention the desk is formed from or contained in the container (e.g., case). In such embodiments a side of the container is converted to become the top of the desk. In other embodiments a side of the container is attached to the container by a hinge and one or more latches and is pivoted away from the container to form a work surface (e.g., a surface to support the screen of a laptop computer 31). Additional work surfaces can form from portions of the container. Examples include a pull-out platform that is pulled-out from the container, slidable laterally, or a folded up work surface that is unfolded from the container 24. These work surfaces can be hingedly connected to the desk, slidable laterally or pull outs housed in slots in the desk.

In certain embodiments of this invention a desk stand is housed within the desk as a telescoping tube with a base at the end and it is pulled out from the desk and locked or otherwise secured to form a desk stand 23. The desk stand may include an adjustment device 22 that changes the height of the desk. The person of skill in the art is aware of other collapsing mechanisms that can be used for the desk and desk stand. Metal and plastic are the preferred materials used for the desk stand.

In certain embodiments of this invention a collapsible chair is also included with the desk. The collapsible chair is housed within the desk (or in some embodiments housed specifically within the desk stand part of the desk) as a telescoping tube with a seat at the one end and a base at the other end with a connecting portion that is fixedly attached to the base to the desk stand 23. The chair is pulled out from the base of the desk stand 23 and locked or otherwise secured to form a chair 25. The chair (or other seating device such as a stool or bench) may include an adjustment device 24 that changes the height of the chair by means and/or hardware known to a person of skill in the art (e.g., set screw, tension device). The person of skill in the art is aware of other collapsing mechanisms (e.g., folding legs, telescoping leg(s)) that can be used for the chair. Metal and plastic are the preferred materials used for the collapsible chair.

Embodiments of the case, collapsible desk embodiments and collapsible chair embodiments of this invention can include ergonomic, comfort, and/or efficiency enhancing features that specifically or better fit, or optimize or otherwise enhance, the physical needs, desires, or experiences of different people doing different activities that may use these workstations. In certain embodiment of this invention, this can include a wrist rest, which, in some embodiments is adjustable to fit a specific person or activity. In other embodiments of this invention, the case also includes a foot mat and/or footrest, which, in some embodiments are each adjustable to fit a specific person or activity. In other embodiments of this invention, the chair includes a backrest and/or lumbar support.

In certain embodiments of the collapsible desk embodiments, a beverage or cup holder is attached. In other embodiments of the collapsible desk embodiment, a mobile telephone holder is attached. In other embodiments of the collapsible desk embodiment, a power source is included, with outlets for computer devices and other apparatus (e.g., charging devices, lights, audio speakers). In certain of these embodiments, the power source has surge protection, and in others, battery back-up capabilities. In other embodiments of the collapsible desk embodiment, one or more workspace surfaces are provided that may be housed on or in the desk and then they can fold out, pivoted out, slid out laterally, be taken out, or be otherwise deployed out of the desk and/or case. These can include in some embodiments charging stations, keyboard holders, mouse holders, telephone holders, notepad holders, book holders, file holders, writing surfaces and other devices, surfaces, and areas.

Example 2

An embodiment of this invention can include an interface platform with a central operating command center. In certain embodiments of this central operating command center, an interface platform is used with interface technology known to a person of skill that can or is capable of interfacing with one or more devices, such as the computer devices of certain embodiments used with the case described in Example 1 (e.g., such as one or more laptop computers, tablets, mobile telephones, or other computerized devices). Embodiments of this interface platform allow the user to create, modify and view their agendas, to-do lists, schedules and calendars from various computer devices (e.g., laptop computers and mobile telephones) in one central location. Certain embodiments of a central operating command center can detect whether a hotspot or Wi-Fi interface is available, access cloud-based storage and applications, access SaaS in particular, and/or transfer information to and from one or more computer devices.

Other embodiments of this invention can include personal assistant technology that is known to a person skilled in the art that is present on one or more computer devices. In preferred embodiments this personal assistant technology interacts with artificial intelligence technology ("AIT"), which is also known to a person skilled in the art. Embodiments of this personal assistant technology can include automated call services, in person call services, lists of confirmed calls and appointments made through texts, lists of calls that need to be made each day, and/or notes of responses received.

Embodiments of this personal assistant technology can also include the listing and updating of tasks that need to be completed, canceled, and/or postponed, the scheduling or rescheduling of meetings and appointments, through manual or voice actuated inputs. Embodiments of this personal assistant technology may notify the user when appointments are set. Other embodiments of this personal assistant technology can be set to make telephone calls at set time intervals until appointments are successfully make and/or to confirm appointments through texts. Other embodiments can book reservations and make appointments for other to-do list tasks and/or provide reminder notes or messages to the one or more computer devices.

Embodiments of this invention can include security features that interact with the central operating command center, personal assistant technology, and/or other features of embodiments of the customizable workstation. Certain of these embodiments require a validation code and/or password to operate, such as before providing personal information for business transactions. Embodiments of this invention also can include cloud-based, accounting, outside support, and/or bill paying systems and/or interfaces. Such systems in certain embodiments can be adjusted according to needs. In other embodiments, AIT capability is applied to further customize, personalize or otherwise enhance the user's experiences.

Example 3

In this example, particular embodiments of interface platforms, such as an in-sync system with a central command operating center, are further described. These systems allow the user to view or layout their agenda from various devices in one location, i.e., the central command operating center. It brings everything together into one place at one time through an in-sync system interface platform, whether the user is using their laptop computer, mobile telephone, tablet, or other computerized device. This system offers a way to combine, manage, and navigate information from several different devices, all brought together in one space at one time with an interface platform, while providing the user with the equivalent of their own personal assistant (with, for example artificial intelligence capabilities) without having to continually open or closes files, tabs, and windows from different devices, because now all these devices are conveniently accessible in one space and at one time.

Embodiments of the in-sync system make it easier to manage/operate tasks, and effectively balance out the user's work/home life. It helps the user to monitor and balance their time by having their own personal assistant system that includes such features and capabilities as detection of Wi-Fi or network hotspots, cloud-based/SaaS access to pull information to the user's mobile telephone, laptop, and/or tablet, for example, by linking into this one central command operating center, where the user can view on screen and then adjust, add and manage information as well as save in one central location and then transfer back to these individual devices in a reframed, revised or adjusted format. The user can access things such as their personal schedule, business budgets, and/or excel documents for the week/month to review things in their schedule and view an altered/combined information status from other devices that can be brought over to the in-sync system with an interface platform using typing or voice commands. This provides everything all in one place without having to continue to pull up each device and work on each one separately, thus having to save on all these different devices.

Once the devices are linked in and are available in the in-sync system, a user can pull up, expand, lay out, view and maneuver using the central command operating center by pulling from either one or from several devices without having to continue to pull up each device and navigate each one separately anymore. In certain embodiments, the user can simply link-in all the devices to the in-sync system through a self-contained power source outlet. For the immediate organization, arrangement, postponements or rescheduling of important tasks and deadlines or the rescheduling of meetings (e.g., time dates and notes/memos personal/business contacts at a glance for the days agenda), whether personal or business, all these items can be brought over into the in-sync system through the system's interface platform technology. Thus, all of the user's devices are simultaneously linked-in through the in-sync system through the self-contained power source, and, in some embodiments, access also is linked-in to cloud-based SaaS capabilities. In certain embodiments, the user can lay out and review each day's business, by typing or voice activation, which is readily at hand no matter how many devices the user needs to work from or where the user is located.

Other Embodiments

Although the present invention has been described with reference to teaching, examples and preferred embodiments, one skilled in the art can ascertain its essential characteristics, and without departing from the spirit and scope thereof can make various changes and modifications of the invention to adapt it to various usages and conditions. Those skilled in the art will recognize or be able to ascertain using no more than routine experimentation, many equivalents to the specific embodiments of the invention described herein. Such equivalents are encompassed by the scope of the present invention.

What is claimed is:

1. An improved portable customizable workstation comprising a portable case, the portable case comprising:
   a. a deployable collapsible desk, the deployable collapsible desk comprising;
      i. a top piece that can be pivoted back to provide a backstop to a laptop computer screen, said top piece being hingedly attached to the top of the deployable collapsible desk,
      ii. aside piece that can be pivoted to the side to provide support for a tablet computer, a mobile telephone or both, said side piece being hingedly attached to or slidable laterally from the deployable collapsible desk,
      iii. a laptop computer holder that is fixedly attached to the top of the deployable collapsible desk thereby holding said laptop computer,
      iv. a deployable collapsible desk stand, said deployable collapsible desk stand is fixedly attached to and deployed out of the bottom of the deployable collapsible desk when deployed rests on the floor;
      v. a desk adjustment device that adjusts the height of the deployable collapsible desk, wherein said desk adjustment device is fixedly attached to the deployable collapsible desk stand;
   b. a deployable collapsible chair-which comprises a seat, a chair stand, and a chair adjustment device that adjusts the height of the seat, wherein said seat is fixedly attached to the chair stand and wherein said chair stand is fixedly attached to the deployable collapsible desk stand; and
   c. an in-sync interface platform that integrates and synchronize the functions of two or more different computer devices wherein said interface platform allows for sharing of access and data between the computer devices, and wherein said improved portable customizable workstation is configured to be adjustable and customizable to accommodate and enhance different people with different physical needs which include height, leg length, arm reach, eye level and disabilities thereby improving task organization, efficiency, time management, and convenient integration and synchronization of information from said different computer devices.

* * * * *